3,403,990
PROCESS FOR MAKING FOAM GLASS
Ernst Otto Schulz, Neuhaus am Rennweg, Thuringia, Germany, assignor to VEB Schaumglaswerk Taubenbach, Kreis Neuhaus am Rennweg, Germany
No Drawing. Filed Dec. 28, 1964, Ser. No. 421,594
5 Claims. (Cl. 65—22)

ABSTRACT OF THE DISCLOSURE

A process for making foam glass wherein mixtures of sulfur trioxide-containing glass and active carbon are first sintered in a pure steam atmosphere having a partial pressure above 200 mm. Hg and subsequently heated at a temperature ranging from 800° to 900° C. to form a foam structure.

---

The present invention relates to a process for making foam glass.

Processes are known for making foam glass in which the control of the foaming action is effected by temperature regulation and by the nature of the ingredients of which the system is composed. For instance, one of the known processes comprises heating glass powder which contains a certain amount of sulfur trioxide with finely divided active carbon. Due to the reaction of the sulfur trioxide with the active carbon, gases are produced which generate a cellular structure in the glass having become viscous by the heating process. Within the foam glass cells there is also some hydrogen sulfide. In general, the presence of that gas is considered as unimportant and is given in an amount of 0.5 to 1.5% by volume.

The known processes for making foam glass are complicated and the volume of the foam as well as the rate of foam formation is a result of the starting mixture and of temperature regulation.

It is the object of the present invention to provide a process in which foam glass production is improved both as regards the rate of foam production per time unit and the yield of foam produced. It is also an object to arrive at a higher rate of foam glass production without resorting to higher temperatures than normally used.

In accordance with the present invention the improved process for producing foam glass comprises sintering glasses containing sulfur trioxide and active carbon in an atmosphere of pure steam having a partial pressure above 200 mm. Hg and thereafter foaming the system in a known manner.

The process is based on the discovery made by gas-chromatographic measurements that the amount of hydrogen sulfide in the foam glass cells is much higher than hitherto assumed, and it can be as high as 11% by volume. Therefore, the hydrogen sulfide produced in the reaction cannot be considered a secondary side effect but must be considered an important factor in the foam glass production. The formation of the gas occurs by a series of reactions from water adhering to the glass and from the sulfur content of the sulfur trioxide. The process of foaming is therefore completed as soon as the water content of the system is used up, although in this stage, there are still some amounts of sulfur trioxide and carbon capable of reacting.

It is known that each starting mixture contains a certain amount of water which has been absorbed partly in the melting process of the crude glass, and partly during the processing from the surrounding atmosphere. Measurements have further shown that the major portion of the water content of the starting mixture capable of being foamed is returned to the surrounding atmosphere during the sintering step, except when the loss of water content is prevented by the process according to the invention.

According to the invention, the sintering is carried out in a furnace, the atmosphere of which has a partial pressure of steam considerably higher than the one present in the combustion gases of the conventional industrial heating devices, and at least so high that the water molecules adhering to the glass surface are in equilibrium as far as their vapor pressure is concerned, with the water molecules in the atmosphere of the furnace. If that were not so, the foaming system would give off steam continually and this would be lost as a participant of the reaction. If, according to the invention, sintering is carried out in a steam atmosphere of 200 to 760 mm. Hg partial pressure, a considerable reduction of the time required for foam formation is achieved while, at the same time, the amount of foam produced is substantially increased as compared to a process in which the sintering is carried out in a conventional manner with a normal combustion gas atmosphere.

Any known devices can be used in the process according to the invention. The sintering operation may, for instance, be effected in a muffle furnace. During the sintering operation, steam is introduced into the furnace around the mass to be sintered until a gas-proof glaze is obtained. In another embodiment, an electrically heated furnace chamber may be used into which steam is introduced. Finally, it is also possible to work with an open hearth furnace, heated by liquid or by gaseous fuels. Steam is introduced to the hearth in such an amount that the partial pressure of steam is higher than that of the combustion gases, that is above 200 mm. Hg.

In a preferred mode of operation, the sintering process can be effected in a chamber furnace. Steam is admitted into the hearth of the chamber furnace and the temperature regulation, according to this invention, leads to a glassy gas-proof sintering of the mass, whereupon the temperature is increased to 800 to 900° C. in a known manner and the sintered mass thereby made to foam.

In the following the invention will be more fully described in a number of examples which are given by way of illustration and not of limitation. Also in the examples, the process of making foam glass in the absence of steam is compared to operating in an atmosphere of pure steam and one containing steam and oxygen.

Example 1

Operational conditions: Sintering and foamig carred out in absence of steam, in an atmosphere of dry argon gas.

The furnace was an electrically heated chamber furnace having approximately the dimensions of 600 x 600 x 500 millimeters. The mold for the foamed glass, having for instance a capacity of 13 liters and being made of heat-resistant material, was placed on a lining of silicon carbide at the bottom of the chamber. The chamber is closed by a sealed door. Argon was fed to the chamber continuously during the entire process through a window in the chamber door. Neither air, oxygen, nor steam were present.

Starting material: 2080 g. foamable ground material, made from glass of the following composition: $SiO_2$, 72.5%; $Al_2O_3$, 2.5%; CaO, 6.0%; $Na_2O$, 16.5%; $K_2O$, 2.5%; the $SO_3$ contents of the glass is 0.65%.

The glass was sintered in a known manner and was then ground in a ball mill to a surface of 7000 cm.$^2$ per gram. Before grinding the glass, an addition was made of 0.16% of active carbon black having a particle size of 170–200 A. When the mold was introduced into the chamber, the temperature was 850° C. The nominal values of the control for ceiling and bottom heaters were adjusted to 850° C. Immediately after the chamber had been charged, argon was admitted. The controls heated the inside of the chamber in such a manner that the nominal temperatures of 850° C. were reached after about 40 minutes. After 12 miuntes more at this temperature, the mold was filled with foamed glass. Total time for formation of 13 liters foam glass: 52 minutes.

Example 2

The heating chamber, temperatures and starting materials were the same as in Example 1, except in this instance the chamber was filled with gas obtained from a low temperature carbonization of lignite briquettes. The steam thus obtained had a partial pressure of approximately 280 mm. Hg. The mold was filled after 45 minutes showing an acceleration of the process due to the action of the steam.

Example 3

The heating chamber, temperatures and starting materials were the same as in Examples 1 and 2. Through the window saturated steam was admitted throughout the process in such a manner that no residual air could remain in the chamber.

The mold was already filled with foam glass after 28 minutes.

From the above examples it can be clearly seen that improved and increased yields of foam glass are obtained according to this invention. While, in principle, it is also possible to increase the yield per unit time by the use of higher temperatures, this is not favorable for reasons of operating the process. It is an advantage of the process, according to the invention, that the conventional temperature of 850° C. may be decreased if it is not desired to work for maximal output, but if it is intended rather to save the metal parts, e.g. the feeding device in the chamber, and the material of the mold, from deterioration.

What I claim is:
1. A process for making foam glass which comprises reacting mixtures of sulfur trioxide-containing glass and active carbon by first sintering the mixtures in a steam atmosphere which is at least as high as the vapor pressure of the water molecules adhering to the glass surface, and thereafter causing foam formation by heating.
2. A process according to claim 1, wherein the sintering takes place in an atmosphere of pure steam.
3. The process according to claim 1, wherein the sintering takes place in an atmosphere of steam having a partial pressure above 200 mm. Hg.
4. The process according to claim 1, wherein the foaming step is carried out by heating the sintered mass to a temperature ranging from 800 to 900° C.
5. A process for making foam glass which comprises reacting mixtures of sulfur trioxide-containing glass and active carbon by first sintering the mixture in a pure steam atmosphere which is at least as high as the vapor pressure of the water molecules adhering to the glass surface, having a partial pressure above 200 mm. Hg and subsequently causing foam formation by heating at a temperature ranging from 800 to 900° C.

References Cited

UNITED STATES PATENTS

| | | | |
|---|---|---|---|
| 2,264,246 | 11/1941 | Lytle | 65—22 |
| 2,596,669 | 5/1952 | Ford | 65—22 |
| 3,163,512 | 12/1964 | Schill et al. | 65—22 |

DONALL H. SYLVESTER, *Primary Examiner.*

R. L. LINDSAY, *Assistant Examiner.*